US006593546B2

United States Patent
Mela

(10) Patent No.: US 6,593,546 B2
(45) Date of Patent: Jul. 15, 2003

(54) ARC WELDING GENERATOR WITH INPUT VOLTAGE ADAPTING REGULATOR STAGE

(75) Inventor: Franco Mela, Piazzola Sul Brenta (IT)

(73) Assignee: Selco S.r.l., Onara di Tombolo (IT)

( * ) Notice: Subject to any disclaimer, the term of this patent is extended or adjusted under 35 U.S.C. 154(b) by 0 days.

(21) Appl. No.: 09/858,714

(22) Filed: May 17, 2001

(65) Prior Publication Data

US 2001/0042739 A1 Nov. 22, 2001

(30) Foreign Application Priority Data

May 22, 2000 (IT) ..................................... PD2000A0136

(51) Int. Cl.⁷ ................................................. B23K 9/10
(52) U.S. Cl. .................................................... 219/130.1
(58) Field of Search ..................... 219/130.1, 130.31, 219/130.32, 130.33, 137 PS; 363/17

(56) References Cited

U.S. PATENT DOCUMENTS 5,926,381 A    7/1999  Moriguchi et al. ............ 363/17
6,023,037 A    2/2000  Church et al. ................. 363/89
6,023,416 A    2/2000  Shikata et al. ................. 363/17

FOREIGN PATENT DOCUMENTS

DE    42 11 906       6/1993
DE    195 22 369      1/1997
EP    0 970 775       1/2000
WO    97 01211        1/1997

Primary Examiner—Clifford C. Shaw
(74) Attorney, Agent, or Firm—Guido Modiano; Albert Josif; Daniel O'Byrne

(57) ABSTRACT

A welding generator comprising an input rectifier stage, a bank of leveling capacitors, an inverter block, a transformer, a rectifier stage and an inductor downstream of which the arc forms and an input voltage adapting regulator stage having, in series at the output of the input rectifier, a first controlled electronic switch with in output a first diode also connected to the common line, an inductor, a second controlled electronic switch and a second diode being connected in series downstream of the first controlled electronic switch, the output of the inductor being connected to the common line, the second diode being connected to the bank of leveling capacitors; the voltage $V_{in}$ measured at the output of the rectifier stage having thus the same orientation as the voltage $V_0$ measured across the bank of leveling capacitors.

1 Claim, 3 Drawing Sheets

ARC WELDING GENERATOR WITH INPUT VOLTAGE ADAPTING REGULATOR STAGE

BACKGROUND OF THE INVENTION

The present invention relates to an arc welding generator with input voltage adapting regulator stage.

A typical diagram of an arc welder, according to the known art, is shown in FIG. 1 and is constituted by a rectifier stage 1 followed by a bank of leveling capacitors 2, followed by an inverter block 3 with high-frequency electronic switches which drives a transformer 4.

The secondary winding of the transformer 4 is followed by a rectifier stage 5 and has an inductor 6 for leveling the output current.

The arc forms between the inductor 6 and the common line of the rectifier stage.

The voltage applied to the inverter block 3 is the voltage being present across the bank of leveling capacitors 2, which is supplied by the input rectifier stage 1.

This means that the maximum voltage value being present across the bank of capacitors 2 coincides with the peak value of the rectified voltage being present in output to the rectifier stage 1.

In these conditions, the electronic switches of the inverter stage 3 must be sized so as to be able to withstand such voltage peak value.

Obviously, in order to ensure the operation of the generator for supply voltages that are higher than the nominal supply voltage it is necessary to oversize, in terms of voltage, the electronic switches of the inverter, with a consequent overall efficiency loss of the generator.

This is necessary because it must be taken into account that the welder may have to operate with power supplies in which the voltage can vary due to reasons linked to the fact that the line is not controlled, that it is a building yard line, that at certain times of the day there can be variations due to the disconnection of loads or because power is drawn from a stand-alone generator driven by a motor.

The same problems can occur on very long lines, where resonance with the inductors and the capacitors of the machine may occur.

Clearly, the use of electronic switches capable of withstanding high voltages entails a decrease in efficiency, because these electronic devices suffer losses which increase as their maximum operating voltage increases.

If one also wishes to ensure the operation of the generator for supply voltages lower than the nominal voltage without performance losses, i.e., with an equal delivered power level, it is necessary to oversize the electronic switches of the inverter in terms of current.

This occurs, for example, when considerable line drops occur in distribution systems which are insufficient with respect to the connected loads.

This oversizing in terms of current entails an increase in the nominal power of the switches and once again a loss of overall efficiency of the inverter stage that is sized thereon.

The above has led to the development of structures for arc welding generators which adopt intermediate regulator stages which allow to obtain an input voltage for the inverter stage 3, present across the capacitor bank 2, which is stable while the voltage of the power supply of said generator varies.

An example of the above is shown in FIG. 2, which illustrates an intermediate stage between the rectifier block 1 and the capacitor bank 2; said intermediate stage is known as "boost" stage and is obtained by means of an inductor 71, an electronic switch 72, and a diode 73.

This stage is able to stabilize a constant voltage across the capacitors 2 by means of an appropriate control device.

However, said stage can operate if the supply voltages that are present in input to the block 1 have a peak value which is lower than the value of the stabilized voltage across the capacitor 2, but operation for higher voltage values is not allowed.

This entails that, in order to ensure operation with high supply voltages, the voltage that must be stabilized across the block 2 is high, and accordingly it is still necessary to oversize the electronic switches of the inverter stage, in terms of voltage, even in the presence of a regulator stage, with the already noted consequences in terms of loss of efficiency.

Another known solution is shown in FIG. 3, wherein the fundamental element of the system is a voltage adapting stage 101 which is interposed between the rectifier block 102 and the capacitor bank 103.

Downstream of the capacitors 103, which have a leveling function, there is a conventional inverter block 104, the adapter transformer 105, the rectifier stage 106 and the inductor 107 at the output of which the arc 108 forms.

The voltage adapting stage 101 is constituted by an electronic switch 109, by an inductor 110 and by a diode 111, which are connected as shown in FIG. 3.

A control device, not shown, allows to keep constant the voltage $V_0$ measured across the block of capacitors 103 as the voltage $V_{in}$ measured at the output of the rectifier stage 102 varies, both in the case of $V_{in} > V_0$ and in the case of $V_{in} < V_0$.

Substantially, the control device acts on the opening and closure of the switch 109, maintaining the indicated conditions.

In this circuit diagram, however, the voltage $V_0$ is negative with respect to the voltage $V_{in}$ and the cut-off voltage of the switch 109 and of the diode 111 is $V_{in} + V_0$, which is high for high input voltages $V_{in}$.

This entails the use of components having high cut-off voltages, which can entail losses in conduction and a non-optimum efficiency of the adapting stage.

Moreover, the value $V_{in} + V_0$ for wide ranges of the input voltage can reach values higher than the cut-off capacity of the devices normally used in these machines, with the consequent need to use series-connected components; this can entail complications linked to the difficulty of ensuring a symmetrical distribution of the voltages across said components.

SUMMARY OF THE INVENTION

The aim of the present invention is to provide a generator for welding which solves or in any case greatly reduces the problems that have been mentioned.

A consequent primary object is to provide a welding generator which is capable of ensuring the operation of the generator without loss of performance as the supply voltage varies, be it a three-phase or single-phase voltage, over a wide range of values.

Another object is to provide a welding generator which is capable of operating both with values that are lower than the nominal voltage and with values that are higher than the nominal voltage while maintaining a stable voltage value across the capacitor bank.

Another object is to provide a welding generator which is structured so as to allow optimum sizing of the electronic switches of the inverter stage with the goal of improving the efficiency of this stage and therefore of the entire generator.

Another object is to provide a welding generator in which it is possible to optimize the sizing of the semiconductor devices that are contained in it and in particular in the adapting stage, so as to achieve a high overall efficiency of the generator.

This aim and these and other objects which will become better apparent hereinafter are achieved by a welding generator with an input voltage adapting regulator stage of the type that comprises an input rectifier stage, a bank of leveling capacitors, an inverter block, a transformer, a rectifier stage and an inductor downstream of which the arc forms, characterized in that said regulator stage has, in series at the output of said input rectifier stage, a first controlled electronic switch to the output of which a first diode is connected, said first diode being further connected to the common line, an inductor, a second controlled electronic switch and a second diode being present in series downstream of said first controlled electronic switch, the output of said inductor being connected between said inductor and the common line, said second diode being connected to the bank of leveling capacitors, said arrangement causing the voltage $V_{in}$ measured at the output of the input rectifier stage to have the same orientation as the voltage $V_O$ measured across the bank of leveling capacitors.

BRIEF DESCRIPTION OF THE DRAWINGS

Further characteristics and advantages of the invention will become better apparent from the following detailed description of the prior art already defined in the introduction and of some preferred but not exclusive embodiments of the invention, illustrated in the accompanying drawings, wherein.

DESCRIPTION OF THE PREFERRED EMBODIMENTS

Figure 1:
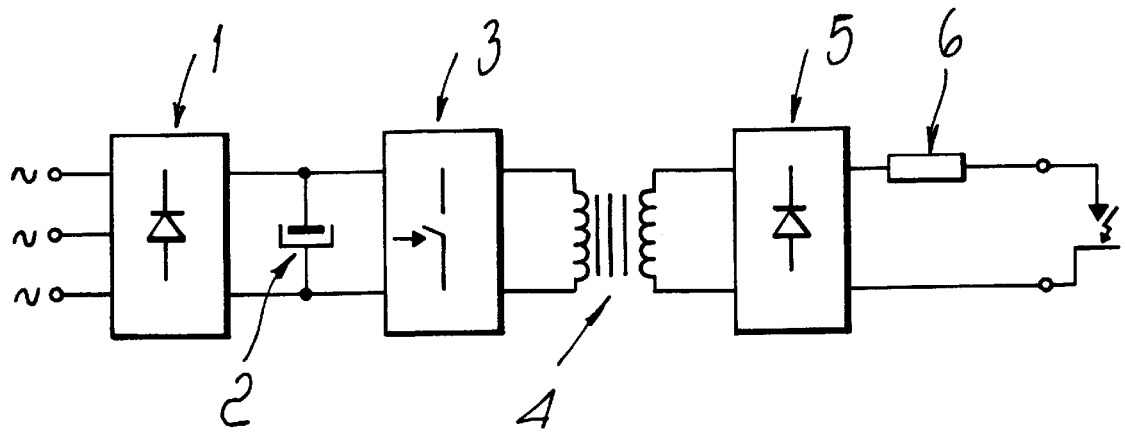
FIG. 1 is, as mentioned, a diagram of a welding generator according to the prior art.
Figure 2:
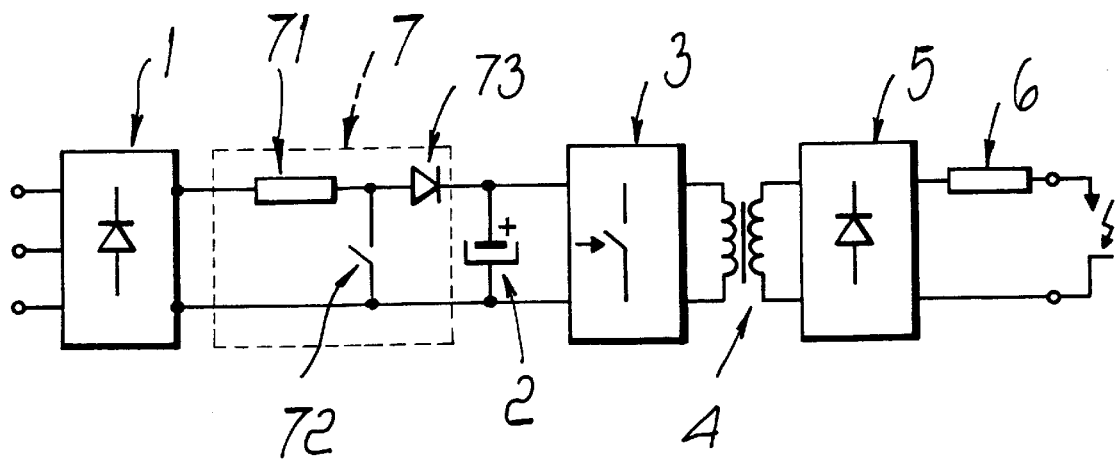
FIG. 2 is a view of a second type of electronic welder according to the prior art, with a boost-type preregulator stage.
Figure 3:
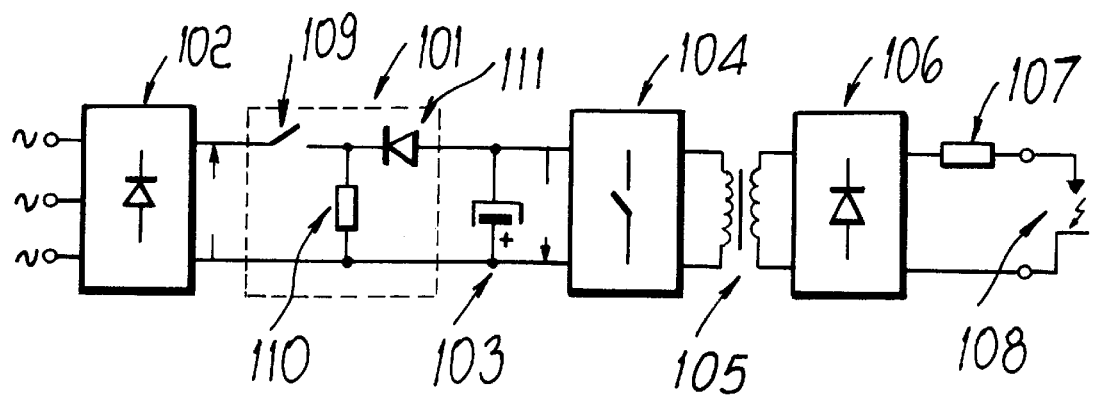
FIG. 3 is a view of a third type of welding generator according to the prior art, with a single-switch preregulator stage with voltage inverted across the bank of capacitors.

With reference to the figures, it has already been mentioned that FIGS. 1, 2, and 3 are diagrams of welders according to the prior art.

Figure 4:
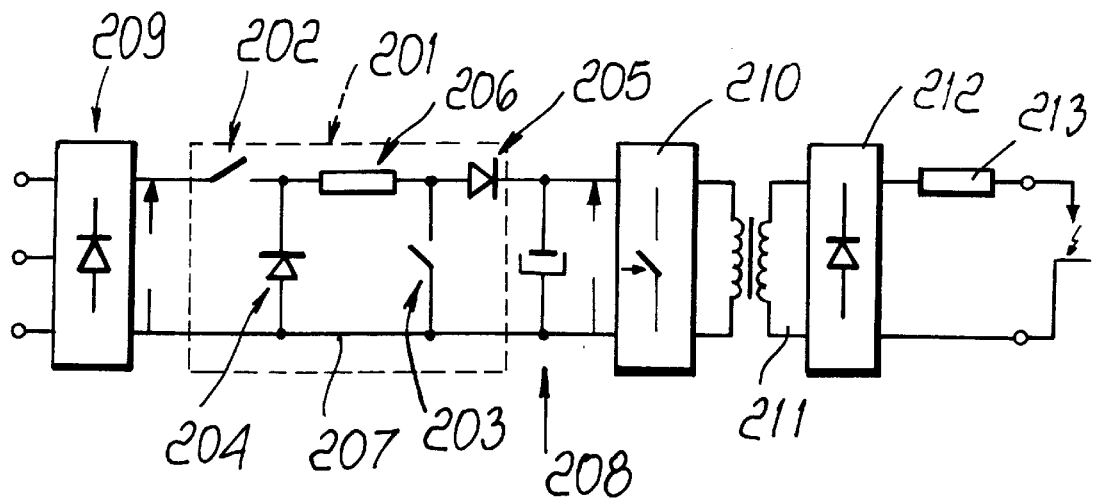
FIG. 4 is a diagram of a welding generator according to the invention, with a preregulator stage of the double-switch type.

The invention in its basic form is shown in FIG. 4.

In this diagram, the adapting stage, now designated by the reference numeral 201, has two electronic switches, designated by the reference numerals 202 and 203 respectively, and two diodes, designated by the reference numerals 204 and 205 respectively, and an inductor 206, all arranged as shown in FIG. 4.

Substantially, the diode 204 is connected between the output of the first switch 202 and the common line 207, the inductor 206 is arranged in series to the output of the first switch 202, the second switch 203 is connected between the output of the inductor 206 and the common line 207, while the diode 205 is in series between the output of the inductor 206 and the block of capacitors 208.

As can be noted, in this arrangement the voltage $V_O$ measured across the block of capacitors 208 has the same orientation as the voltage $V_{in}$ measured at the output of the rectifier block, now designated by the reference numeral 209.

The switches 202 and 203, like the diodes 204 and 205, have an inverse voltage across them, respectively $V_{in}$ and $V_O$.

This allows to use components with optimum voltage characteristics, with a consequent recovery in terms of efficiency of the adapting stage 201.

Figure 5:
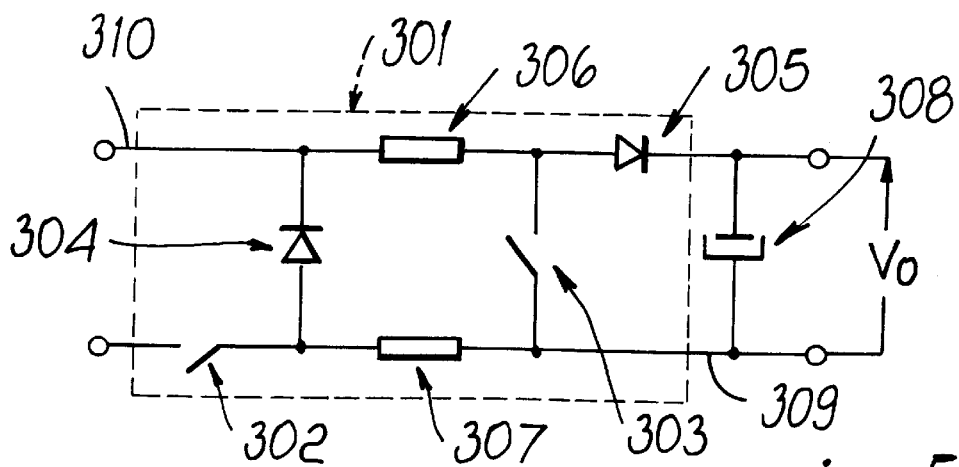
FIG. 5 is a view of a further embodiment of the preregulator stage of the double-switch type.

FIG. 5 illustrates a further embodiment of the adapting stage, now generally designated by the reference numeral 301.

In this case there are again two electronic switches, designated by the reference numerals 302 and 303 respectively, and two diodes 304 and 305, but there are two inductors interposed in the common line 309, and at the output line 310 of the rectifier stage, respectively, such inductors being now designated by the reference numerals 306 and 307.

In this case also, the voltage $V_{in}$ measured in output from the rectifier stage, not shown, has the same orientation as the voltage $V_O$ measured across the block of capacitors, now designated by the reference numeral 308.

Figure 6:
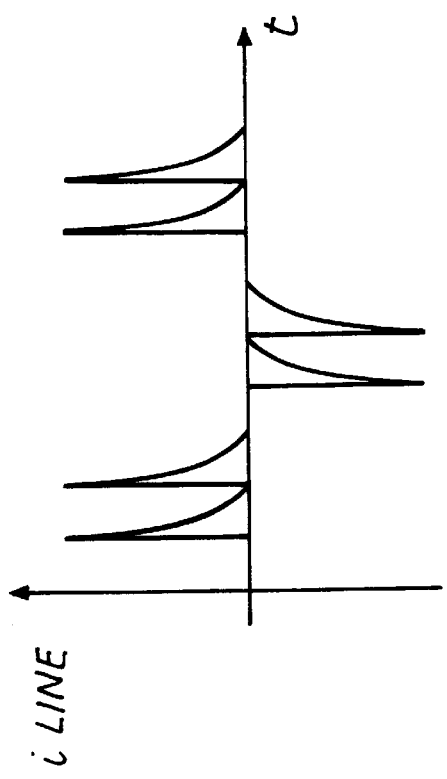
FIGS. 6, 7, 8 and 9 show the typical behaviors of the line current in three-phase and single-phase machines provided according to the prior art and according to the invention.
Figure 8:
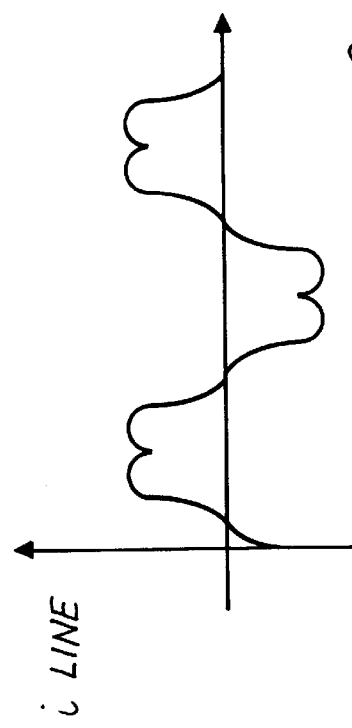

FIGS. 6 and 8 show the typical behaviors of the absorption of line current for a single-phase and a three-phase generator, showing how the typical absorption occurs with a high effective value due to the peaks of current and to their harmonic content.

This absorption can be rendered substantially sinusoidal by using the regulator according to the invention, appropriately controlled, thus making the generator equivalent to a resistive load.

Figure 7:
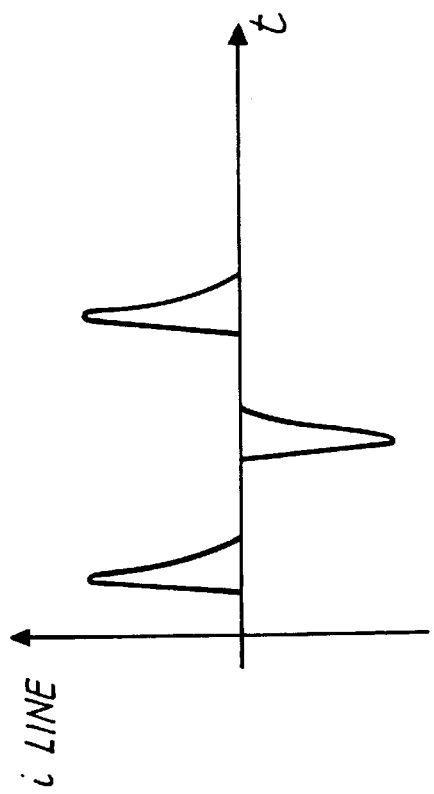
Figure 9:
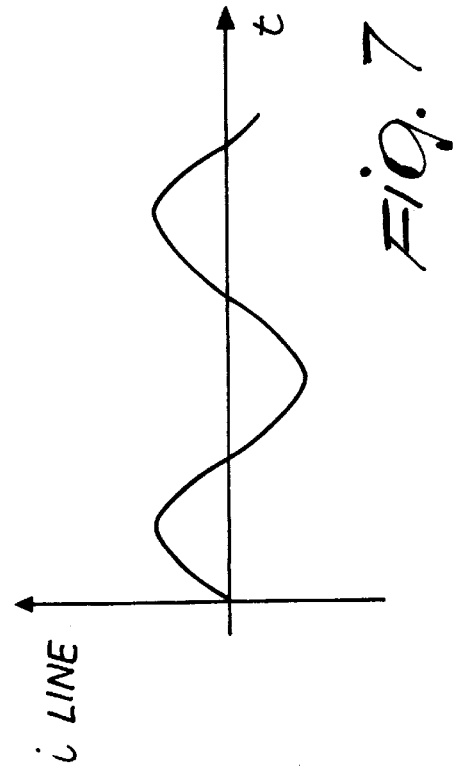

The typical behaviors obtained by using the preregulator are plotted in FIG. 7 for a single-phase load and in FIG. 9 for a three-phase load.

This allows not only to obtain line absorption with low harmonic content, but also to optimize the sizing of the rectifier bridge in input, since the current peaks are greatly reduced.

From what has been described and illustrated, it is evident that the proposed aim and objects have been achieved and that in particular an arc welding generator has been provided having a voltage adapting stage which allows the single-phase and three-phase operation of the generator as the supply voltage varies over a wide range with respect to the nominal voltage.

In this manner, optimization of the circuit allows to use components which have optimum voltage characteristics, with a consequent recovery in the efficiency of the stage per se and of the entire machine.

The inventive concept expressed and illustrated in the description and in the drawings can be provided in different forms while maintaining the same operating logic.

The disclosures in Italian Patent Application No. PD2000A000136 from which this application claims priority are incorporated herein by reference.

What is claimed is:

1. A welding generator with an input voltage adapting regulator stage comprising: an input rectifier stage; a common line; a bank of leveling capacitors; an inverter block; a transformer; a rectifier stage; and an inductor downstream of which the arc forms, wherein said regulator stage comprises: a first controlled electronic switch which acts on the common line; a first diode connected downstream of said first switch and an output of the rectifier stage; two inductors, a first one of which is interposed in the common line and a second one in an output line of the rectifier stage, downstream of an insertion node of said first diode; a second controlled electronic switch which is inserted between outputs of said two inductors; and a second diode which is inserted between the output of the second inductor of the output line of the rectifier stage and the bank of leveling capacitors.

* * * * *